Figure 1:
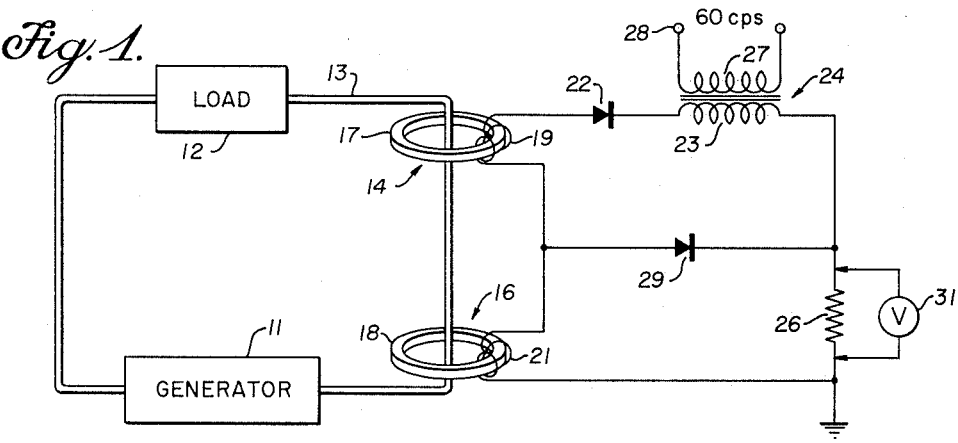

June 9, 1964  A. A. WINDSOR  3,136,948
D.C. INSTRUMENT TRANSFORMER SYSTEM
Filed Feb. 21, 1961  3 Sheets-Sheet 1

INVENTOR.
ALFRED A. WINDSOR
BY
ATTORNEY.

United States Patent Office 3,136,948
Patented June 9, 1964

3,136,948
D.C. INSTRUMENT TRANSFORMER SYSTEM
Alfred A. Windsor, Berkeley, Calif., assignor to the United States of America as represented by the United States Atomic Energy Commission
Filed Feb. 21, 1961, Ser. No. 90,895
5 Claims. (Cl. 324—127)

The present invention relates generally to electrical measuring instruments and more particularly to transformer apparatus for facilitating the measurement of large direct currents of values up to several thousand amperes by utilizing saturable core transformers.

In general, an instrument current transformer has a secondary winding with many turns of wire and a primary winding of very few or even a single turn. Thus, there is a very high step-up ratio from primary to secondary and the resulting lower secondary current is more readily detected with conventional current indicators. Such transformers, with associated circuitry, are used for measuring large direct currents and are also used for measuring currents where very high voltages are present, the transformer serving to insulate the measuring equipment from the high voltage circuit. Negative feedback control of the current generator may also be obtained with this class of transformers. Very little power is dissipated in such a measuring instrument and the accuracy thereof is not particularly affected by temperature changes or other environmental variables.

In spite of the above discussed advantages, many conventional D.C. measuring instrument transformers have limitations which restrict their usefulness. The presence of a stray magnetic field adversely affects the accuracy of the instruments and the accuracy is inherently low when small currents are being measured.

In the present invention, the advantages of prior D.C. current transformers are retained and the disadvantages are largely eliminated. The low power dissipation, and ruggedness of the previous instruments are retained while gaining immunity to stray magnetic fields. The invention makes use of the special characteristics of transformer core materials having a squared B-H curve with a narrow dynamic hysteresis loop. Square loop cores characteristically have a high remanent flux and a high rate of flux change with change in coercive force i.e. such cores have a high incremental mu between opposite polarity states of saturation. Square loop core materials saturate at well defined points when the net flux in the core is increased in either direction from zero.

In the present invention, a toroidal saturable transformer utilizing such core material has a single turn primary and a multiturn secondary winding. The magnetic flux created by the primary direct current through the single turn primary winding can readily drive the core far into the saturated region. A secondary current of much lesser magnitude is passed through the multiturn secondary winding but in a direction opposing the primary current, producing sufficient magnetic flux to largely cancel the primary flux, thus maintaining the core in an unsaturated condition. If the primary current changes, the secondary current is correspondingly changed to maintain the core in an unsaturated condition. Since the secondary current is relatively small in a relatively high impedance circuit, it is readily measured either with a conventional ammeter or the voltage drop across an impedance is indicated on a voltmeter to provide an accurate indication of the primary current. The source for the secondary current is a conventional alternating current transformer connected in series with the secondary of the saturable transformer through a current rectifying diode, holding the core of the saturable transformer in an unsaturated state for most of each cycle of alternating source voltage, the core being saturated during the remainder of the cycle. During the unsaturated portion of the cycle, a steady state direct current flows through the secondary of the saturable transformer, the current being of a magnitude cancelling or bucking the major portion of the flux caused by the primary current. Only the difference flux causes changes in the magnetic condition of the core. The saturable transformer core is saturated for a part of each cycle and during such time no longer regulates the secondary current. Thus, it is necessary to have a second saturable transformer connected in series with the first which can regulate the secondary current during the time the first saturable transformer is saturated. Therefore, the secondary current is regulated during the entire cycle of operation and no filtering or smoothing of the secondary current is necessary, permitting the circuit to respond to very rapid changes in the primary current. There is a low level ripple in the output signal with a peak to peak amplitude equal to twice the core coercive current, such ripple generally being less than 1% of the full output amplitude. If necessary, the ripple can be removed by filtering circuitry without reducing the rapidity of response.

With previous D.C. measuring instruments, it is necessary to rectify a square-wave to obtain a continuous direct current output. In the presence of a stray magnetic field the sides of the square-wave became sloped owing to the saturated inductance of the transformer. After rectification, such a signal has a trapezoidal shape and the average amplitude of the filtered output signal is lowered, giving a current reading which is too low. The present invention is immune to the effects of stray magnetic field since the secondary current flows in only one direction and no rectification is necessary. The current never passes through zero as does a square wave.

Therefore, it is an object of the present invention to provide a more reliable means for measuring large direct currents.

It is another object of this invention to provide an instantly responsive means for detecting rapid variations in the level of a large direct current.

It is yet another object of this invention to provide a direct current measuring instrument which maintains high accuracy in the presence of stray magnetic fields.

It is still another object of the invention to provide a direct current measuring instrument having a flat frequency response.

It is another object of the invention to provide a rapidly acting negative feedback means for maintaining a constant current output from a generator.

Figure 2:
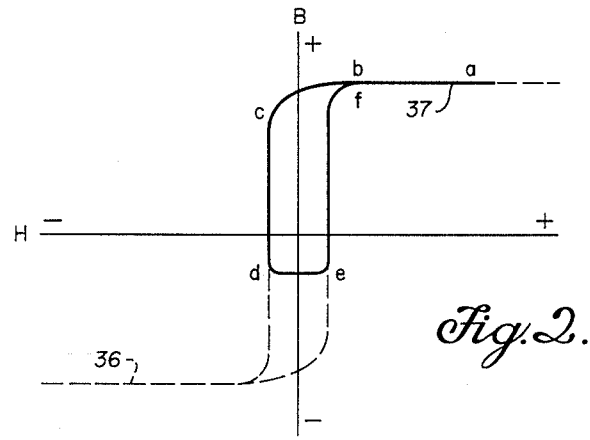
Figure 3:
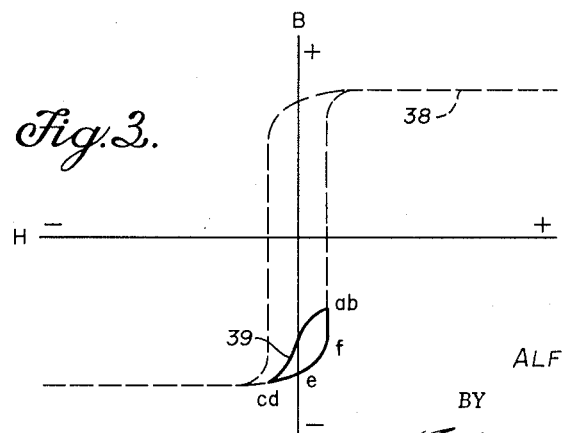
Figure 4:
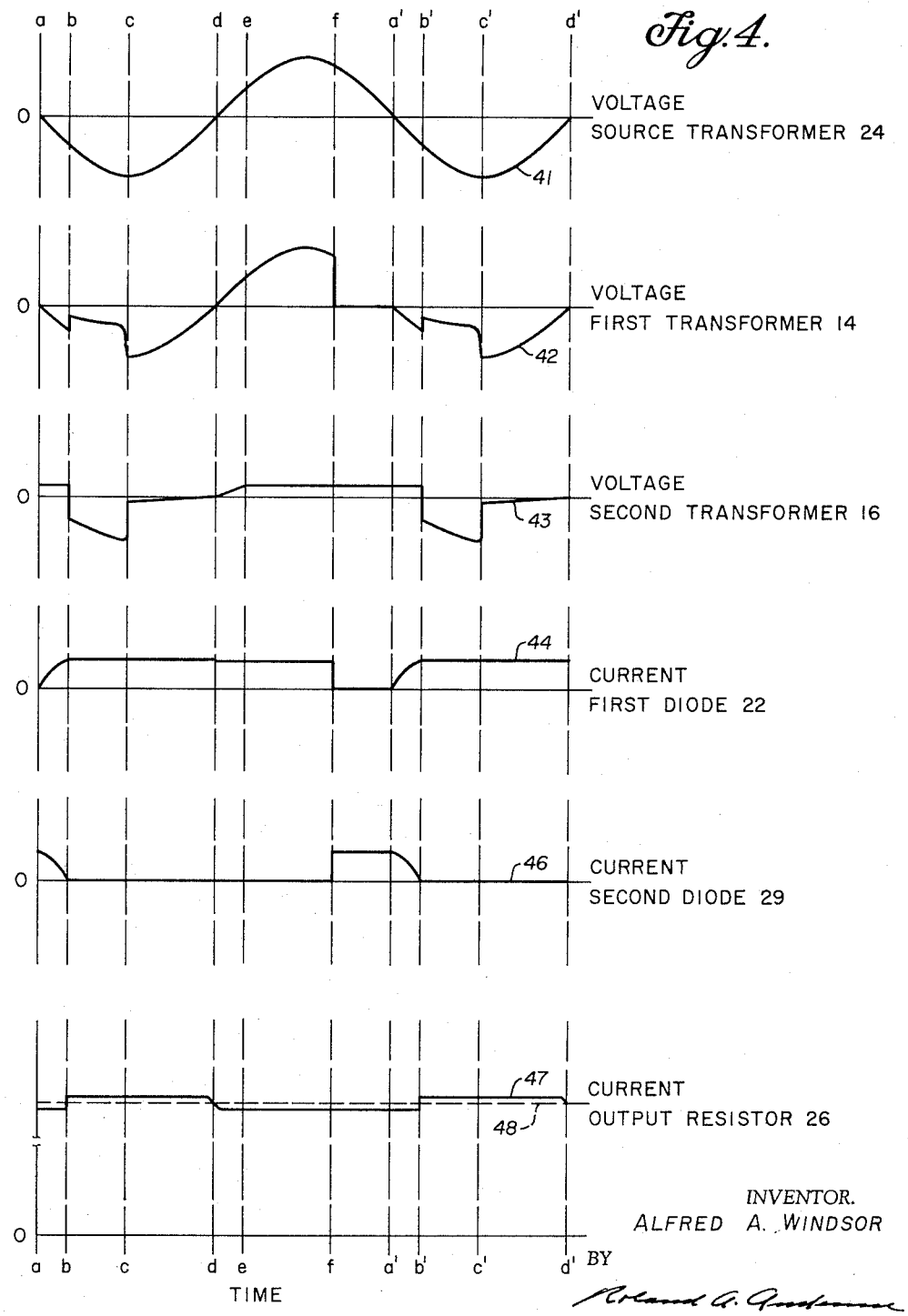
Figure 5:
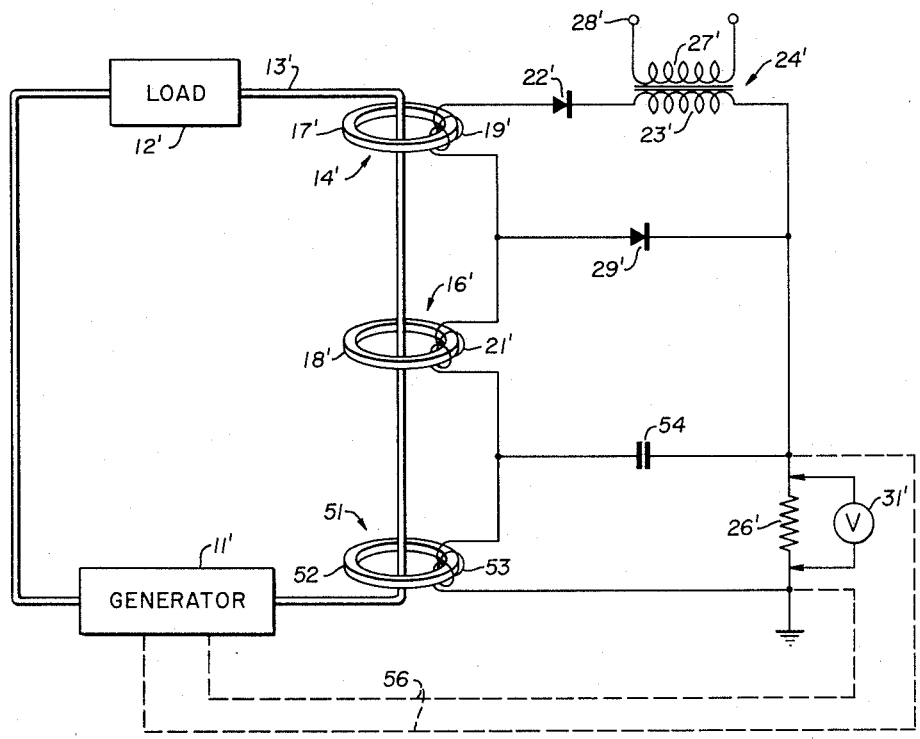

The invention will be better understood by reference to the accompanying drawing of which:

FIGURE 1 is a schematic circuit diagram of means for coupling a direct current measuring instrument to a conductor in which current is to be measured, FIGURE 2 is a B-H curve of a first saturable transformer utilized in the circuit of FIGURE 1, FIGURE 3 is a B-H curve of a second saturable transformer utilized in the circuit of FIGURE 1, FIGURE 4 is a graphical representation of voltages and currents in certain components of the circuit, and FIGURE 5 is a schematic circuit diagram of a modified form of the invention with means for suppressing ripple fluctuations in the output signal.

Referring now to FIGURE 1, there is shown in block form a direct current generator 11 which supplies current to a load 12. The current from the generator 11 to the load 12 passes through a primary conductor or bus 13 which functions as a single turn primary winding for a first transformer 14 and a second transformer 16 in which the primaries are in series. Such transformers 14 and 16 preferably have torodial cores 17 and 18 respectively with the primary conductor 13 passing along the axis thereof. The cores 17 and 18 of the transformers 14 and 16 are formed from a type of iron which has a rectangular B-H curve or hysteresis loop, this property being characteristic of magnetic materials which have an abrupt transition from the saturated to unsaturated state. The two transformers 14 and 16 are provided with secondary windings 19 and 21 respectively and have identical turns ratios from primary to secondary winding. The secondary windings 19 and 21 are connected in a series aiding or additive manner. Thus a second end of the secondary winding 19 is connected to the first end of the secondary winding 21 and the second end of the secondary winding 21 is grounded, although such ground connection may be made to other points in the circuit or omitted entirely if preferred. A first diode 22, the secondary winding 23 of a source transformer 24, and a load or burden resistor 26 are connected in series from the first end of the first transformer secondary winding 19 to ground, the diode 22 being polarized so that the anode thereof is connected to the first end of first transformer secondary winding 19 and the cathode thereof is connected to the source transformer secondary winding 23. The primary winding 27 of the source transformer 24 is connected to an alternating current source 28, a sixty cycle source generally being utilized for convenience although higher frequencies may be used if reducing the weight and quantity of iron in the device is important.

The anode of a second diode 29 is connected to the juncture between the secondary windings 19 and 21 of the first and second transformers 14 and 16 while the diode cathode is connected to the juncture between the source transformer secondary winding 23 and the load resistor 26. To indicate the magnitude of the current being measured, a direct current voltmeter 31 is connected across the load resistor 26, such voltmeter 31 being calibrated in units of the current in the primary bus 13. Other measuring instruments such as an oscilloscope or output connections for a negative feedback signal may parallel or replace the voltmeter 31. The loading effect or power consumption of the measuring circuit upon the primary circuit in conductor 13 is inconsequential. Only a very slight amount of ripple voltage, at the source transformer 24 frequency, is induced into the primary circuit.

Referring now to FIGURES 2 to 4, magnetization, voltage and current curves for certain components of the invention are shown. In FIGURE 2, there is shown by a dashed line 36 the dynamic B-H or magnetization curve for the first transformer 14 indicating the magnetic properties thereof when driven to saturation in alternate directions by an alternating current. Flux density (B) is plotted on the vertical axis while magnetic potential gradient (H) is plotted on the horizontal axis. Such curve is provided to identify the type of core material employed, the actual magnetization curve followed by the first transformer 14, under the conditions in the present invention, being shown by a solid line 37 over the B-H curve 36.

In FIGURE 3, a reference B-H curve is shown by dashed lines 38 for the second transformer 16 such curve being identical to the B-H curve 36 of FIGURE 2. The actual magnetization curve for the core 18 of the second transformer 16 is shown by solid line 39. In both FIGURES 2 and 3 lower case letters from "a" to "f" are shown to provide a convenient reference to particular portions of the curves 37 and 39, such letters also designating a time correlation in the magnetic conditions in the two transformers 14 and 16. For example, the letter "a" refers to the magnetic conditions occurring simultaneously in the two cores. The magnetization curves show the actual magnetization condition with the particular parameters encountered by the transformer cores in the present invention. In general, the transformers may be considered as a constant current regulator when the magnetization curve is in the open unsaturated part of the hysteresis loop, the current being independent of voltage applied from source transformer 24 as long as the voltage exceeds a minimum excitation potential. The constant current regulation applies to the net core magnetizing force, i.e. the primary and secondary currents are in opposite directions and the balanced primary and secondary ampere turns mutually cancel so that the net core magnetizing force is essentially zero, being unbalanced only by the small coercive current. Changes in the amplitude of the source voltage are absorbed in the core with very little change in exciting current because of the steep sides of the B-H loop. An increase in source voltage causes the bottom of the loop 37 shown in FIGURE 2 to move in the —B direction but the H distance across the loop remains nearly constant, such distance being a measure of exciting current. In general a voltage represents a change of flux which means a shift along the B axis. When the magnetization curve is in the saturated or closed portion of the cycle, the impedance of the transformer windings becomes essentially zero and may be considered as a closed switch with no voltage drop thereacross.

Current and voltage waveforms at various points in the circuit are indicated in FIGURE 4. As labeled, sine wave curve 41 indicates the voltage across the source transformer 24 with respect to the cathode of first diode 22, curves 42 and 43 indicate the voltages developed across the first and second transformers 14 and 16 respectively, curve 42 being taken with respect to the anode of second diode 29 and curve 43 being taken with respect to ground. Curves 44 and 46 shown change in current through the first and second diodes 22 and 29 respectively, and curve 47 shows in expanded scale the current through the output resistor 26 with respect to ground. A dashed line 48 superimposed over the curve 47 indicates the primary current in terms of the secondary circuit i.e. the primary current of conductor 13 divided by the transformer turns ratio. The secondary current curve 47 alternately exceeds and is less than the primary current by the amount of the core coercive current. The curves 47 and 48 are then also a comparison of the secondary and primary ampere turns. For correlating the several curves, the lower case letter designations in FIGURES 2, 3 and 4 denote corresponding instants of time in the curves.

Considering now the operation of the invention, and with reference to all figures, assume that the generator 11 is activated and an unknown quantity of current therefrom is passing through the load 12 and the primary windings 13 of the transformers 14 and 16. The primary current will be assumed to be constant at this time. Concurrently, a sixty cycle switching signal is being applied to the source transformer 24.

The circuit operation may be divided for convenience of discussion into two modes. During the first mode from time interval "b" to "f" the second diode 29 is nonconductive and electron current passes through the first diode 22, first and second transformers 14 and 16, output resistor 26, and the source transformer 24. During the second mode from time "f" to time "a" electrons flow through the second diode 29, second transformer 16, and the output resistor 26. In the short interval between times "a" and "b," the circuit is functioning in both modes.

Considering the first mode, the signal from the source transformer 24 applies a negative potential to the cathode of the first diode 22, causing current to flow through the first transformer 14 which is assumed to have just come out of saturation and to be in the core condition designated at time "c" in FIGURE 2. The secondary ampere turns magnetizing force exceeds the primary ampere turns magnetizing force and causes the net core flux level to move from that of time "c" to that of time "d." In the "c" to "d" region the first transformer 14 acts as a constant current regulator. At the same time, the second transformer 16 remains in saturation at the "c—d" region in FIGURE 3 and provides minimal impedance to the current passing therethrough. The electron current passes through the output resistor 26 and causes a voltage drop thereacross, applying a reverse polarity across the second diode 29 and rendering it non-conductive. In FIGURE 4 the voltages at the various designated times are shown by curves 42 and 43.

At time "d" the polarity of the sine wave source voltage passes through zero and into the positive half of the source voltage cycle. However, owing to the primary current in the first transformer 14, current still flows through the first diode 12 in the same direction as before, but the net core flux level is shifted in the opposite direction. The primary current magnetizing force now exceeds the secondary current magnetizing force by the amount of the coercive current. The secondary voltage 42 will exceed the source voltage 41 by a sufficient amplitude to maintain constant current. This effect occurs automatically since any variation in secondary current is reflected in the primary 13 circuit as a change in impedance, consequently the primary potential changes because of such impedance change, altering the secondary potential 42 and restoring the secondary current 44 to the original value. The voltage developed across the first transformer 14 exceeds slightly the source transformer 24 voltage 41 so that the first diode 22 still conducts. By reference to FIGURE 2, it will be seen that from time "c" to time "d" the core flux of the first transformer 14 decreases from saturation flux density until the polarity of the source voltage changes at time "d." The magnetizing force on the core 17 changes direction from time "d" to time "e" (−H to +H) and the core flux again approaches saturation from time "e" to time "f." In the meantime, the core 18 of the second transformer 16 has been at saturation from times "c" to "d," but at time "d" the primary ampere turns exceeds the secondary ampere turns and unsaturates the core. From times "d" to "e" the impedance of the second transformer 16 increases and an increasing potential is developed thereacross, at time "e" the impedance becoming constant. Since the current is held constant by the first and second transformers 14 and 16 between times "e" and "f," the voltage across the second transformer 16 is constant during such period as indicated by curve 43 in FIGURE 4. The voltage across the second transformer 16 is positive from times "e" to "f" and is clamped by the second diode 29 to the same positive potential as that across the output resistor 26.

As shown in FIGURE 2, at time "f" the first transformer 14 saturates, the voltage thereacross dropping to zero. The source voltage back biases the first diode 22 which immediately ceases to conduct. Since there is no secondary current in the first transformer 14 to balance the primary current, the core 17 thereof is driven far into the saturated region. The second transformer 16 is still in an unsaturated condition and, with the second diode 29 conductive, the source voltage 41 is no longer applied to the second transformer 16 and the output resistor 26. The current in the primary 13 of the second transformer 16 creates a current in the secondary 21 thereof by ordinary transformer operation. The second diode 29 is forward biased and current passes therethrough to the output resistor 26 to start the second mode of operation. The second transformer 16 is also a constant current device and provides a steady state secondary current to the load resistor 26 as indicated by curve 47 of FIGURE 4. Although the transformer supplying the current has changed, the quantity of current through the output resistor 26 is unchanged from time "d" to time "b." The second transformer 16 continues to supply current until time "b" when the inverse voltage of the source transformer 24 exceeds the induced voltage of the second transformer 16, the current through the first diode 22 exceeding that through the second diode 29, cutting off the second diode 29 and causing all the current to again pass through the first diode 22. From time "b" to time "c," the cores 17 and 18 of both the first and second transformers 14 and 16 are in an unsaturated condition and so both have impedance, the source voltage is divided between the two transformers approximately as indicated in curves 42 and 43. The second transformer 16 is acting as constant current regulator so that the current through the output resistor 26 is constant from time "b" to time "c." At time "c" the second transformer 16 reaches a saturated condition as indicated in FIGURE 3 and no longer presents any impedance to current flow until time "d" when the polarity of the source voltage 41 changes. From time "c" to time "d" the first transformer 14 is in an unsaturated condition as indicated in FIGURE 2 and is a constant current regulator as described, completing the cycle of operation.

When the primary current of conductor 13 changes in magnitude, the quantity of secondary current required for producing core saturation is varied accordingly. For instance, an increase in primary current requires a corresponding increase in secondary current to obtain the same net core magnetizing force as before. The constant current regulating characteristic of the first and second transformers 14 and 16 applies to the net core magnetizing force so that any change in primary current must be accompanied by a corresponding change in secondary current to maintain such net magnetizing force.

In the majority of situations the slight ripple in the output current through the resistor 26 will not be deleterious, however, if necessary the ripple can be removed without decreasing the frequency response of the instrument. For instance, when a negative feedback signal is obtained from the circuit for controlling the primary current, rapid response with no ripple is necessary.

Referring now to FIGURE 5, a circuit in which the ripple is removed is shown. The circuit as described with reference to FIGURE 1 is utilized with the addition of two filter components. The original components in FIGURE 5 are designated by prime numbers corresponding to the identical components utilized in FIGURE 1. The new components include a current transformer 51 wound on a toroidal core 52 with the same general physical configuration as the first and second transformers 14 and 16. The primary conductor 13 extends along the axis of the current transformer 51 and the secondary winding 53 is connected between the secondary 21' of the second transformer 16 and ground. While the physical configuration of the current transformer 51 may be similar to that of the first and second transformers 14 and 16, the core 52 of the current transformer 51 is comprised of a less saturable material similar to that utilized in a conventional power transformer. The current transformer 51 has a low frequency response that includes the source voltage frequency. A filter capacitor 54 is connected between the cathode of the second diode 29' and the juncture of the secondary windings 21' and 53 of the second transformer 16' and the current transformer 51. If the device is to be utilized as a current regulator, a negative feedback connection is provided from the output resistor 26' to the generator 11' as indicated by dashed lines 56.

The operation of the circuit is identical to that described with regard to FIGURE 1 except that the direct current through the output resistor 26' is filtered by the L-C combination of the capacitor 54 and the inductance of the secondary winding 53 of the current transformer 51. The source voltage ripple is shunted through the low impedance of the capacitor 54 while the current transformer 51 provides a high impedance to such frequencies so that the ripple signal is very effectively shunted around the load resistor 26'. It is however, a necessary requirement of the invention that the response of the instrument to abrupt changes in primary current not be hindered by inclusion of the filter. The capacitor 54 smooths the rapid variations in secondary current produced by the first and second transformers 14 and 16 as a consequence of a change in primary current, but a momentary potential is developed across the secondary winding 53 of the current transformer 51 by the change in primary current flux, thus causing a resultant current to flow in the load resistor 26'. The current transformer may then be considered as restoring the high frequency components in the secondary current which have been removed by filtering except, of course, the undesired coercive ripple signal is not restored. Therefore, if the voltmeter 31' is in the form of an oscilloscope or similar device with fast response, or for feedback control of current, rapid changes in the primary current will be readily indicated without the source ripple signal. As a variation, the capacitor 54 may be replaced by a resistor and the number of turns on the current transformer 51 increased to provide response to a greater range of primary step current changes.

As a further variation, and with reference again to FIGURE 1 the cores of the first and second transformers need not be made from identical square loop material or have the same cross sectional areas. Since the magnetization curve 39 for the second transformer 16 is much smaller than the magnetization curve 37 for the first transformer 14, a smaller core 18 may be provided for the second transformer 16, thereby more efficiently utilizing the core material. Better utilization of core material may also be provided by increasing slightly the number of secondary turns for the second transformer 16 as compared to the first transformer 14.

While the invention has been disclosed with respect to certain exemplary embodiments, it will be apparent to those skilled in the art that numerous variations and modifications may be made within the spirit and scope of the invention and thus it is not intended to limit the invention except as defined in the following claims.

What is claimed is:

1. In a D.C. measuring instrument, the combination comprising a first and a second transformer each having a core characterized by a rectangular hysteresis loop, said transformers having primary windings connected in series and adapted for conducting the current to be measured, said transformers having secondary windings each having a first and a second end, said first transformer secondary having said second end thereof connected to said first end of said second transformer secondary, a third source transformer having a primary winding adapted for connection with an alternating current source and having a secondary winding, a first diode connected in series with said secondary winding of said third transformer, a load resistor connected from said second end of said second transformer secondary to said first end of said first transformer secondary in series with said first diode and said third transformer secondary, a second diode connected from said first end of said second transformer secondary to the juncture of said load resistor with said third transformer secondary and diode series circuit, and a current indicating means connected to said load resistor and measuring current therethrough.

2. A measuring instrument as described in claim 1 further characterized by said first and second diodes each having a cathode electrode and anode electrode and each having the similar ones of said electrodes coupled to said first and second ends respectively of said first transformer secondary.

3. An instrument transformer system for coupling a D.C. current measuring means to a conductor carrying a current to be measured comprising, in combination, a first and a second transformer each having a secondary winding with a first and a second end, each said transformer having a toroidal core encircling said conductor whereby said conductor constitutes a primary winding for each of said transformers, each of said cores being formed of a material having a substantially rectangular hysteresis loop, said first end of said second transformer secondary being connected in series with said second end of said first transformer secondary, an alternating current source, a first unidirectional circuit element, a load impedance connected from said second end of said second transformer secondary to said first end of said first transformer secondary in series with said first unidirectional circuit element and said alternating current source, a second unidirectional circuit element connected in series with said load impedance from said first end of said second transformer secondary to said second end of said second transformer secondary, and means detecting the quantity of current through said load impedance.

4. An instrument transformer system as described in claim 3 and comprising the further combination of a third transformer having a secondary winding connected in series between said load impedance and the second end of said secondary winding of said second transformer, said third transformer also having a toroidal core encircling said conductor whereby said conductor acts as a primary winding therefor, and a filter capacitor connected across said second unidirectional circuit element and said secondary winding to said second transformer.

5. A transformer system for producing a negative feedback signal for application to the current regulator in a direct current generator to deliver a constant current to a load through an interventing load conductor comprising, in combinaiton, a first and a second transformer each having a core characterized by a square hysteresis loop and which encircles said load conductor whereby said conductor functions as a primary winding of said transformers each having a secondary winding with a first and a second end, the second end of said first transformer secondary winding being connected to the first end of said second transformer secondary winding, a first diode, a cyclical current source connected in series with said first diode and the first end of the secondary winding of said first transformer, a load impedance connected from the second end of said second transformer secondary winding in series with said first diode and said cyclical current source, a second diode connected across the secondary winding of said second transformer and said load impedance, and a negative feedback circuit connected across said load impedance and coupled to said current regulator in said direct current generator.

References Cited in the file of this patent
UNITED STATES PATENTS

| | | |
|---|---|---|
| 2,605,302 | Specht | July 29, 1952 |
| 2,650,986 | Semm | Sept. 1, 1953 |
| 2,800,625 | Geroulo | July 23, 1957 |
| 2,950,438 | Gilbert | Aug. 23, 1960 |
| 2,985,817 | Bird | May 23, 1961 |